(12) United States Patent
Alkhateeb

(10) Patent No.: US 10,987,983 B1
(45) Date of Patent: Apr. 27, 2021

(54) DAMPENING SAFETY DEVICE ABLE TO ATTACH TO A SOFT TOWLINE AND METHODS FOR USE

(71) Applicant: KING ABDULAZIZ UNIVERSITY, Jeddah (SA)

(72) Inventor: Abdulhameed Fouad Alkhateeb, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/084,019

(22) Filed: Oct. 29, 2020

(51) Int. Cl.
| | | |
|---|---|---|
| *B60D 1/28* | (2006.01) | |
| *B60D 1/24* | (2006.01) | |
| *B60D 1/18* | (2006.01) | |

(52) U.S. Cl.
CPC .............. *B60D 1/28* (2013.01); *B60D 1/18* (2013.01); *B60D 1/243* (2013.01)

(58) Field of Classification Search
CPC . B60D 1/28; B60D 1/18; B60D 1/243; B60D 1/32; B60D 1/182; A62B 35/04; F16F 7/10; F16F 7/01
USPC .................................................. 188/378, 379
See application file for complete search history.

(56) References Cited

U.S. PATENT DOCUMENTS

| | | | | | |
|---|---|---|---|---|---|
| 686,605 | A * | 11/1901 | Grauel et al. | ............ | H02G 7/14 174/42 |
| 1,193,156 | A * | 8/1916 | Kopczyk | ................. | B60C 27/12 267/72 |
| 1,384,835 | A * | 7/1921 | Hines et al. | ........... | B60D 1/182 280/480 |
| 1,425,528 | A * | 8/1922 | Lind | ...................... | B60D 1/182 267/70 |
| 1,449,346 | A * | 3/1923 | Pagel | ..................... | B60D 1/182 267/71 |
| 1,489,321 | A * | 4/1924 | Henderson | ............. | B60D 1/182 267/72 |
| 1,585,435 | A | 7/1924 | Summers et al. | | |
| 1,597,383 | A * | 8/1926 | Morton | .................... | D07B 1/18 267/73 |
| 1,734,072 | A * | 11/1929 | Blalack | .................. | B60D 1/182 280/480 |

(Continued)

FOREIGN PATENT DOCUMENTS

| | | |
|---|---|---|
| CN | 20638379 U | 8/2017 |
| JP | 9058235 A | 3/1997 |

OTHER PUBLICATIONS

Fisher, Brian. [Fisher's Off-Road], (Dec. 28, 2016). Warn Winching Tip 2016—Maximizing Your Winch's Capabilities [Video], YouTube. https://www.youtube.com/watch?v=ex4KzAUztSQ.*

(Continued)

*Primary Examiner* — Minnah L Seoh
*Assistant Examiner* — Conan D Duda
(74) *Attorney, Agent, or Firm* — W&C IP

(57) ABSTRACT

A towing safety device is attached to a tow or winch line to dampen the recoil of a line if connecting hardware fails during towing or pulling. The dampener comprises a reversibly closable opening and may be stored empty and folded in a vehicle when not in use. When filled with weighted matter, such as sand, soil or stones found in the field and attached to the towing hardware and tow line at two points, the towing safety device is deployed to avoid or reduce the likelihood of injury or property damage that can occur with a freely ricocheting line.

4 Claims, 14 Drawing Sheets

(56) References Cited

U.S. PATENT DOCUMENTS

| | | | | |
|---|---|---|---|---|
| 1,771,082 A * | 7/1930 | Gignac | B60D 1/18 | 280/480.1 |
| 1,985,468 A * | 12/1934 | Strang | B60D 1/182 | 280/480 |
| 2,011,233 A * | 8/1935 | Persons | B60D 1/182 | 280/480 |
| 2,609,214 A * | 9/1952 | Vos | B60D 1/30 | 280/495 |
| 2,665,128 A * | 1/1954 | Guffey | B60D 1/182 | 267/71 |
| 2,751,218 A * | 6/1956 | Pass, Jr. | B60D 1/18 | 267/69 |
| 2,796,953 A * | 6/1957 | Becker | A62B 35/04 | 188/371 |
| 2,943,591 A * | 7/1960 | Schneider | B63B 34/63 | 114/253 |
| 3,000,652 A * | 9/1961 | Hawkins | B60D 1/182 | 280/406.1 |
| 3,051,519 A * | 8/1962 | Sudeikis | F16G 15/00 | 403/43 |
| 3,250,527 A * | 5/1966 | Ramsey | B60D 1/182 | 267/70 |
| 3,306,600 A * | 2/1967 | Roux | F16F 1/46 | 267/74 |
| 3,869,114 A * | 3/1975 | Schneider | B60D 1/182 | 267/69 |
| 3,952,685 A * | 4/1976 | Hollenbush | B60D 1/182 | 267/72 |
| 4,105,221 A * | 8/1978 | Fleming | A01B 59/041 | 172/450 |
| 4,718,690 A * | 1/1988 | Baker | B60D 1/182 | 280/480 |
| 4,746,137 A * | 5/1988 | Bolser | B60D 1/182 | 280/457 |
| 4,757,979 A * | 7/1988 | Essex | F16F 1/3615 | 114/215 |
| 5,090,503 A * | 2/1992 | Bell | A62B 35/04 | 182/5 |
| 5,224,427 A * | 7/1993 | Riches | A62B 35/0056 | 104/115 |
| 5,308,101 A * | 5/1994 | Monty | B60D 1/182 | 267/74 |
| 6,050,587 A * | 4/2000 | Panhausen | B60D 1/18 | 280/480 |
| 6,092,826 A * | 7/2000 | Pingel | B60D 1/18 | 280/449 |
| 6,241,296 B1 * | 6/2001 | Crabtree | B60D 1/182 | 267/69 |
| 7,845,669 B2 | 12/2010 | Yeh et al. | | |
| 8,807,292 B2 * | 8/2014 | Liston | B61H 9/02 | 188/65.1 |
| D791,651 S * | 7/2017 | Haynes | B60D 1/18 | D12/162 |
| D791,896 S * | 7/2017 | Peterson | D21/810 | |
| 9,745,030 B2 * | 8/2017 | Bates | B63B 32/70 | |
| 9,849,740 B2 | 12/2017 | Sparkes | | |
| 2007/0170295 A1 * | 7/2007 | Breeden | B65H 75/4402 | 242/388.1 |
| 2009/0194970 A1 * | 8/2009 | Yeh | B60D 1/182 | 280/483 |
| 2009/0235425 A1 * | 9/2009 | Walker | A63B 29/02 | 2/69 |
| 2010/0051381 A1 * | 3/2010 | Wydner | A62B 35/04 | 182/5 |
| 2011/0068021 A1 * | 3/2011 | Tuchman | B60D 1/18 | 206/216 |
| 2012/0205478 A1 * | 8/2012 | Balquist | A62B 35/04 | 242/379.1 |
| 2014/0161370 A1 * | 6/2014 | Tuchman | A45C 9/00 | 383/4 |
| 2014/0251722 A1 * | 9/2014 | Schurian | A62B 35/04 | 182/3 |
| 2014/0251731 A1 * | 9/2014 | Jones | A62B 35/04 | 182/231 |
| 2016/0075198 A1 * | 3/2016 | Haynes | B60D 1/18 | 414/800 |
| 2016/0199678 A1 * | 7/2016 | Tsai | A62B 35/04 | 248/636 |
| 2016/0297265 A1 * | 10/2016 | Sparkes | B60D 1/182 | |
| 2018/0015312 A1 * | 1/2018 | Jones | A62B 35/04 | |
| 2018/0078795 A1 * | 3/2018 | Lin | A62B 35/04 | |
| 2019/0022439 A1 * | 1/2019 | Dillon | G08B 21/02 | |
| 2019/0118010 A1 * | 4/2019 | Patton | A62B 35/0056 | |
| 2019/0118011 A1 * | 4/2019 | Patton | A62B 35/0056 | |
| 2019/0143159 A1 * | 5/2019 | Grant | E04G 21/3204 | 248/636 |
| 2019/0195310 A1 * | 6/2019 | Carroccia | F16F 13/04 | |
| 2019/0217134 A1 * | 7/2019 | Green Mullins | F16F 7/006 | |
| 2019/0275356 A1 * | 9/2019 | Jones | A62B 1/10 | |
| 2019/0308041 A1 * | 10/2019 | Harding | A62B 35/0018 | |
| 2019/0329611 A1 * | 10/2019 | Chen | B60D 1/185 | |
| 2020/0030645 A1 * | 1/2020 | Bertoti | A62B 35/04 | |
| 2020/0171333 A1 * | 6/2020 | Carroccia | A62B 35/04 | |

OTHER PUBLICATIONS

Homolo (Mar. 5, 2019 (see reviews)). Homolo Waterproof Winch Cable Dampener Blanket Orange Color. Amazon. Retrieved Dec. 17, 2020 from https://www.amazon.com/Homolo-Waterproof-Dampener-Blanket-Orange/dp/B07FDRRSRH/ref=cm_cr_arp_d_product_top?ie=UTF8.*

* cited by examiner

Figure 4A
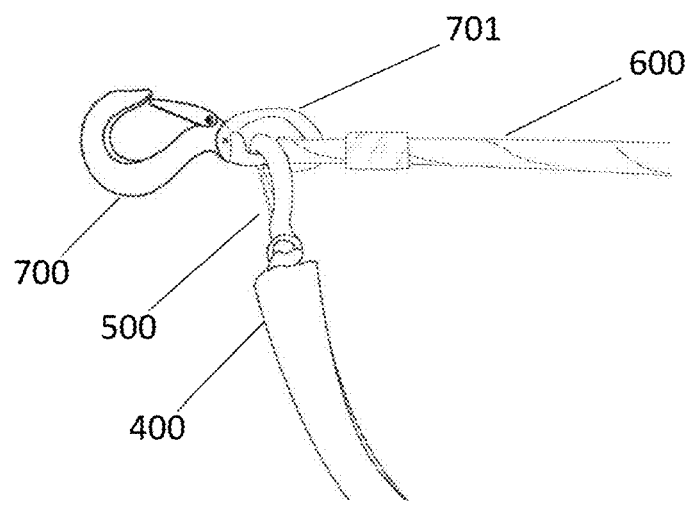
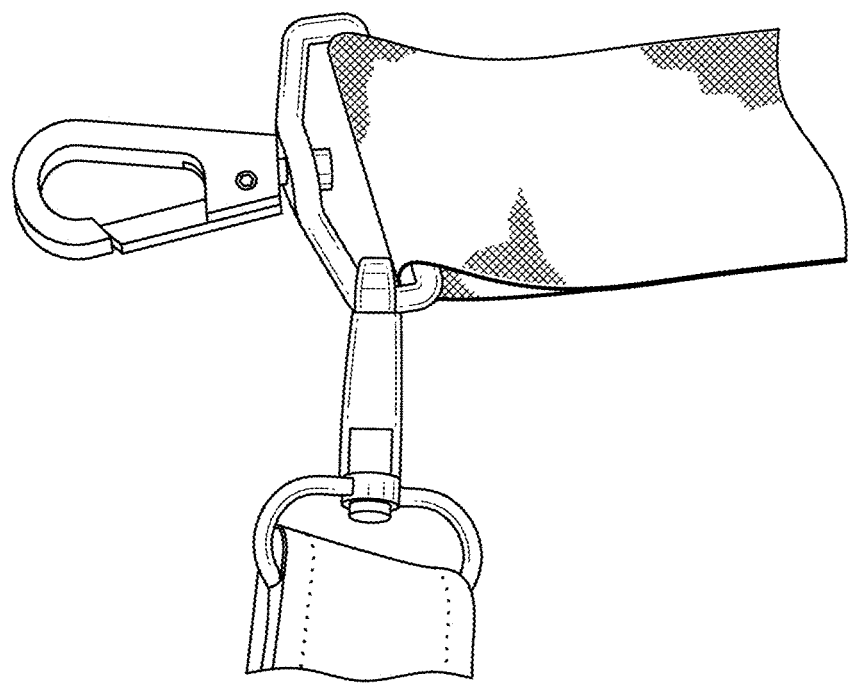
FIG.4B

Figure 5A
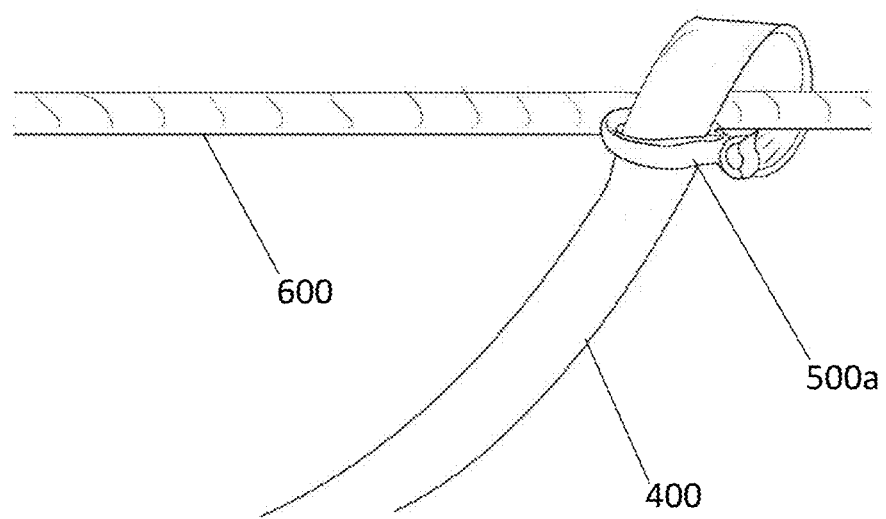
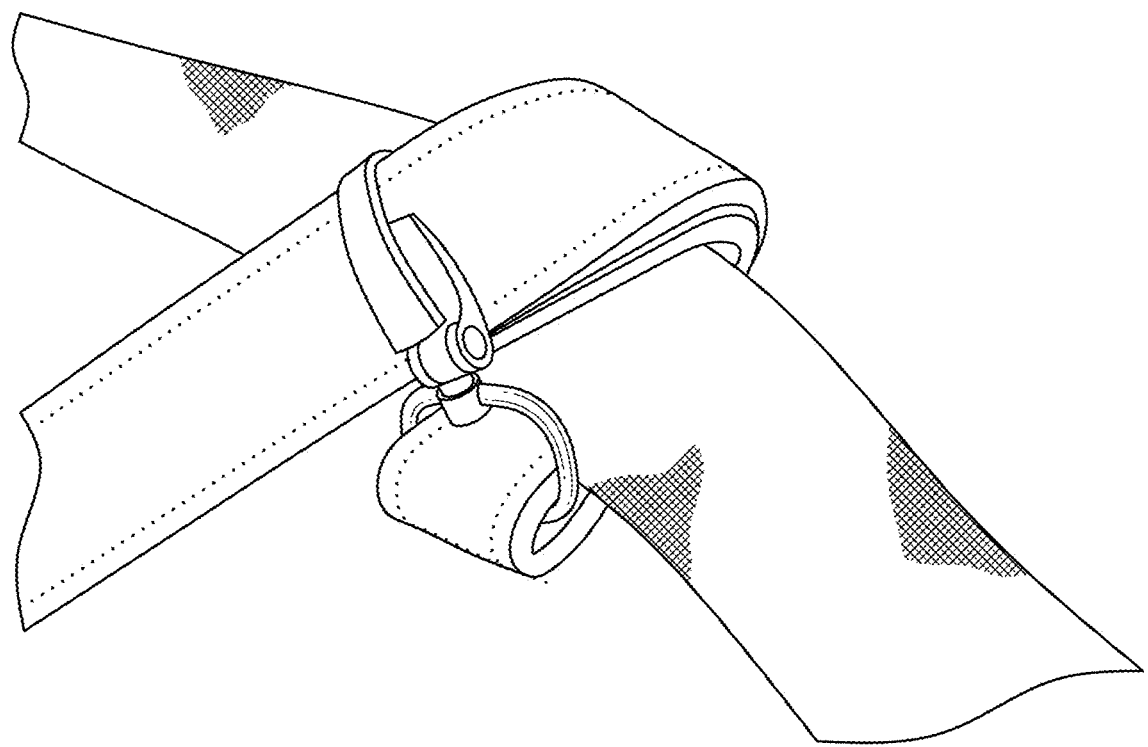
FIG.5B

Figure 5C
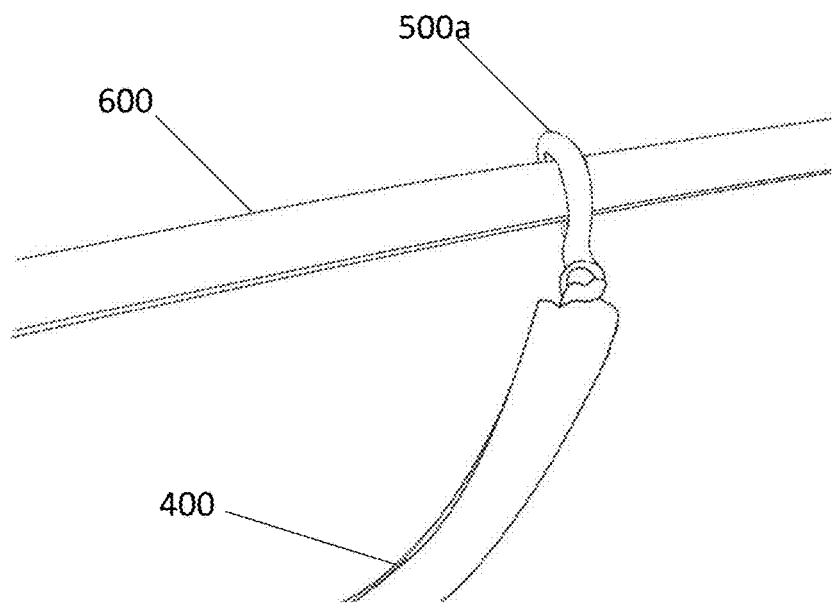
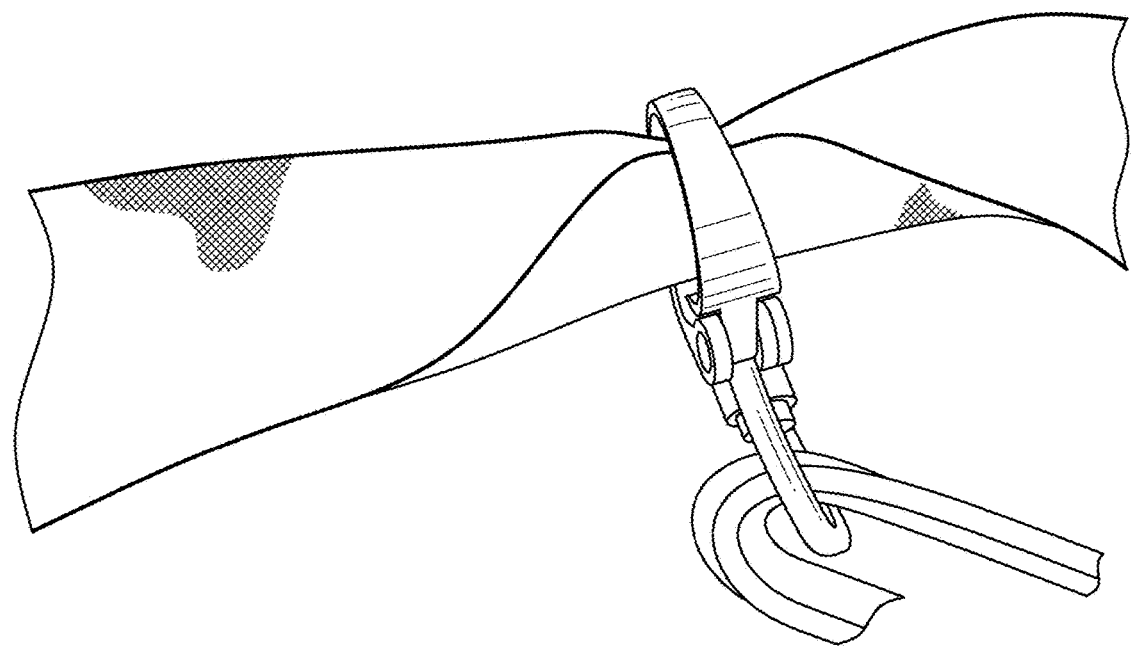
FIG.5D

DAMPENING SAFETY DEVICE ABLE TO ATTACH TO A SOFT TOWLINE AND METHODS FOR USE

BACKGROUND OF THE INVENTION

Field of the Invention

The invention generally relates a device to be attached to a towline to reduce the chance of injury and/or property damage caused by the towline and any attached hardware if the tow line or its hardware fails. The invention further relates to a method of using the safety device to prevent injury and/or property damage due to breakage of a towline and/or failure of its hardware.

Background

During the course of operating a vehicle, it may be necessary to tow the vehicle for one reason or another—for example, if the vehicle were to break down, slide off the road into a ditch, to get stuck in mud, snow, sand or other types of terrain. In these situations, it is desirable to have a means of simply and safely dislodging the vehicle if it is stuck and towing it to a desired location (i.e., to a garage, back onto the road, etc.). The most convenient tool for this is frequently a soft tow apparatus, comprising a rope, strap, or cable with a hook or other means of attachment at either end, since any of these are easily coiled and stored in a small amount of space within a vehicle for emergency uses. The vehicle in distress can be attached to the rescuing vehicle using the hooks or other means of attachment and pulled to safety.

There is always a danger, particularly where the vehicle being towed or to be towed is heavy or firmly stuck, that a soft tow apparatus can snap or break at any of a number of points, when it experiences a shock load, or if the vehicle being towed is simply too heavy to move. For example, the soft tow apparatus might break along its length or at the connection of the soft tow apparatus to the vehicle, or where it is sewn, or the receivers on the vehicle, or parts of the receivers or hooks, to which the soft tow apparatus is attached may also be pulled off of the vehicle. In other instances, a hook may break or inadvertently be released during the towing process due to a defect or malfunction or the user did not attach it properly and securely. A broken bolt, pin, tow hook, carabiner or other hardware becomes a projectile when it is released from a moving vehicle because the towline will act as a sling, as like that of a slingshot. The hook or other metal part at the end of the towline will ricochet or shoot back with great speed and force and will hit the vehicle at the other end. This can not only break the windows of the towed vehicle, or the front or rear window of the rescuing vehicle, but can also cause serious injury or even death to persons inside the vehicles or standing nearby or significant damage to other property. In fact, individuals have been killed or severely injured when towing belts have broken, or when hooks, shackles, trailer balls, etc. have become dislodged.

Towing safety is a concern in areas aside from the daily operation of vehicles on roadways. In some instances, people use their primary vehicle, such as a sports utility vehicle, a pickup truck, or other automobile, to tow other vehicles such as trailers carrying recreational equipment or camping trailers. The recreational vehicle (RV) industry is rapidly expanding, too, with many drivers attaching trailers or other vehicles behind their RVs with a towing assembly. In addition, boating and water sports such as wake-boarding, kite-boarding, water-skiing and others rely on soft cables, ropes or straps that can break and cause injury to the user or to the boat or boat pilot towing the user.

There is a need for an improved safety device for use that is specifically designed for use with flexible towing assemblies such as straps, ropes, and the like. Preferably, such a safety device would be easy to install, relatively inexpensive to manufacture and maintain, and would protect against broken components breaking away and becoming dangerous projectiles. Specifically, there is a need for a simple device that effectively absorbs the high-velocity ricochet energy from failure of a soft towing apparatus, while still being easy to use by consumers and easy to manufacture.

SUMMARY OF THE INVENTION

The invention is a dampener to be used as a towing safety device for a soft towline. The towing safety device is configured to dampen a ricocheting motion if a towline or winch line is inadvertently released while under tension. The towing safety device comprises a receptacle made of a flexible material of a suitable size and strength to hold at least ten kilograms. In one embodiment of the invention, the receptacle has a resealable opening along one side for filling the receptacle with matter. In another embodiment of the invention, the resealable opening is at or near an end of the receptacle. A line extends from each end of the receptacle, which may be a sturdy fabric, a rope, a cable, a chain, a wire or any other suitable material. At the distal end of the line is a clasp configured to attach to either the soft towline itself, or to a part of a hardware connector or other attachment at the end of the towline, which is used to connect the towline to a towing vehicle or a vehicle or other object to be towed.

In one embodiment, a dampener for a tow or winch line comprises a receptacle configured to support at least ten kilograms, a first connector configured for reversible connection with towing hardware, a second connector configured for reversible connection with a tow or winch line, a first line extending from a first end of the receptable to the first connector, and a second line extending from a second end of the receptable to the second connector. The reversible connection of the first connector with the towing hardware at an end of the tow or winch line maintains the position of the dampener to the end of the tow or winch line. The first and second lines may be a rope, a cable, a cord, a wire or constructed of the same fabric as the receptacle. The receptacle may be made of any flexible material, including but not limited to a heavy-duty fabric, such as canvas or sailcloth, a heavy weight plastic or neoprene. The first and second connectors may be clasps, hooks, loops, carabiners, or any other suitable connector that may or may not lock.

In another embodiment, the invention is a method of using one or more dampeners for a tow or winch line, comprising the steps of:

providing the one or more dampeners having a receptacle configured to support at least ten kilograms and having an opening that is reversibly closable, a first connector configured for reversible connection with towing hardware, a second connector configured for reversible connection with a tow or winch line, a first line extending from a first end of the receptable to the first connector, and a second line extending from a second end of the receptable to the second connector;

opening the receptacle;

filing the receptacle with weighted materials or liquids;

closing or sealing the opening;

connecting the first connector to a part of the towing hardware;

connecting the second connector to the tow or winch line;

attaching the towing hardware connected to the first connector to a towing vehicle;

attaching the opposite end of the tow or winch line to a vehicle or object to be towed or pulled; and towing or pulling the vehicle or object.

When at least two dampeners are used, a dampener may be attached to each end of the tow or winch line. In another embodiment of the method of the invention, two or more dampers are attached at each end of the towline.

A towing vehicle may be a car, a truck, an SUV or a boat, and the object to be towed may be another car, a truck or SUV, a boat, a trailer, a motorcycle, an all-terrain vehicle, or any object to be towed or pulled. For example, a user may wish to pull a felled tree from a roadway or driveway after it is cut down or knocked down during a storm. In another embodiment, the towing vehicle is a sail or a parasail and the object to be towed is a person using water sport equipment. In yet another embodiment, the towing vehicle is a boat, and the object to be towed is a person using water sports equipment. Water sports equipment can include but is not limited to water skis, waterboard, personal watercraft and personal floatation devices.

In one embodiment of the invention, the receptacle is left empty for storage until a time of deployment of the safety device. When it is needed the resealable opening is opened and the receptacle can be filled with any suitable material that is available. This could include but is not limited to stones, rocks, pebbles, gravel, sand, bricks, soil and/or water, or any other materials that might be found. Alternatively, a user might carry the filling matter in a storage compartment or trunk of a vehicle, such as a bag of sand, bricks or any other heavy materials of a suitable size. In another embodiment, the receptacle is filled with heavy weight materials and stored in a vehicle for future use. Since the weight of the matter filling the receptacle needs to weigh more than the hardware parts at the end of the soft towline, the total weight of the filler is preferred to be at least 10 kilograms. However, less weight per receptacle may be used if two or more towing safety devices are connected at the end of a towline. In another embodiment, the total weight of each towing safety device is greater than 10 kilograms, and multiple towing safety devices are deployed on an end of the soft towline to compensate for hardware that exceeds 10 kilograms. In yet another embodiment, multiple towing safety devices are used on both ends of the soft towline.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 4A-4F show three different configurations for attaching a first end of a TSD to towing hardware on a towline. FIG. 4A shows a clasp 500 connecting to a connection point 701 that is part of the towing hardware, and FIG. 4B is a photograph of a prototype illustrating the configuration of FIG. 4A. FIG. 4C shows a clasp 500 connection to a hook 700, which serves as a connection point so that use of a separate connection point 701 is not required. FIG. 4D is a photograph of a prototype illustrating the configuration shown in FIG. 4C. In FIG. 4E, a loop in a towline 600 forms a connection point 701 to which a clasp 500 is connected. FIG. 4F is a photograph of a prototype in which a clasp 500 is connected directly to a towline 600. FIGS. 5A-5D show two different configurations for connecting a second end of a TSD to a towline. FIG. 5A shows a line 400 wrapped around a towline 600 and a clasp 500*a* is attached to the line 400. FIG. 5B is a photograph of a prototype in the same configuration as that of FIG. 5A. FIG. 5C shows a clasp 500*a* connected directly to a towline 600. FIG. 5D is a photograph of a prototype in the same configuration as that of 5C.

DETAILED DESCRIPTION

Figure 1:
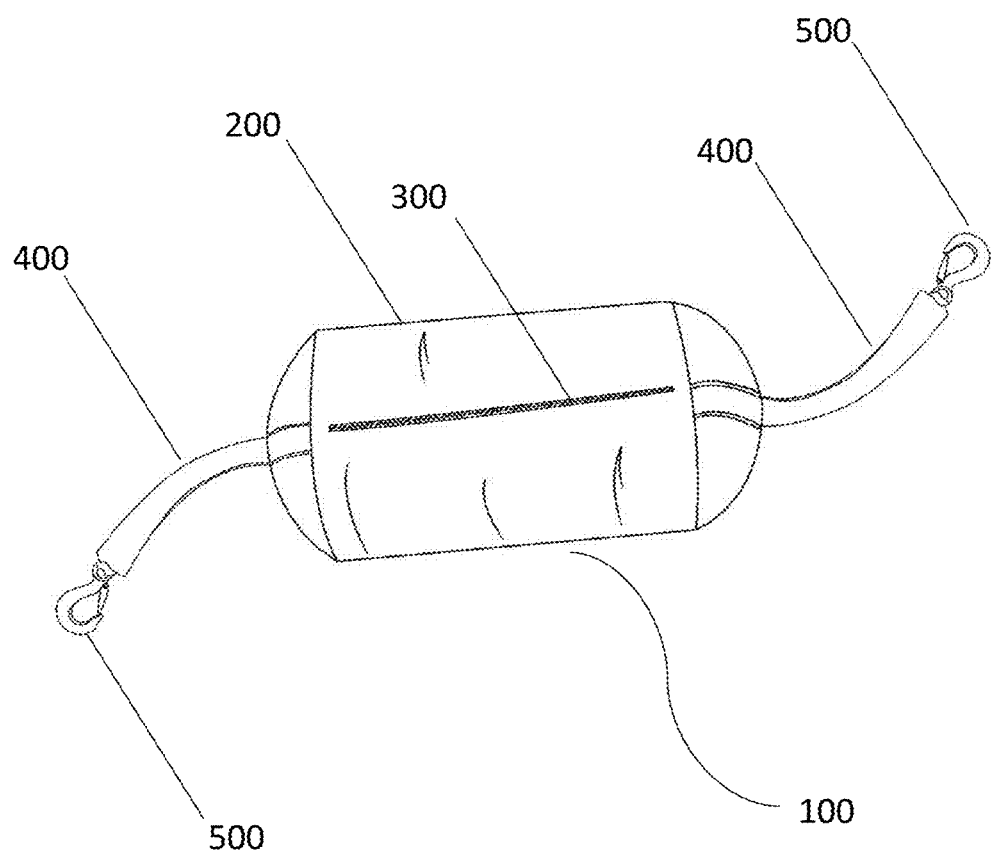
FIG. 1 shows a diagram of a TSD of the invention. Not drawn to scale.

The following descriptions and examples illustrate some exemplary embodiments of the disclosed invention in detail. Those of the skill in the art will recognize that there are numerous variations and modifications of this invention that are encompassed by its scope. Accordingly, the description of a certain exemplary embodiment should not be deemed to limit the scope of the present invention.

The invention is a towing safety device that can be mounted onto any soft tow line apparatus. If the hardware attaching the tow line to a vehicle or towed object fails, the device of the invention dampens the slingshot effect of the tow line and any attached hardware, thereby inhibiting the ricocheting motion and reducing the possibility of injury or property damage.

As used herein, the phrase "towing safety device" refers to a device known in the art as a "dampener" and these are used interchangeably to refer to the invention. Dampeners of various types are used to minimize or prevent the dangerous recoil that occurs when a tow or winch line breaks or is accidentally released while in use.

As used herein, the terms "tow line", "towline", "winch line", and "winchline" are used interchangeably to refer to a line, rope, strap, wire or cable used to connect a towing vehicle to another vehicle or to any other object to be pulled or towed. Another term in the art is a "snatch strap", which may also be used in practicing the invention. Any of these are used interchangeably to refer to a line configured to bear the tensile forces associated with towing, winching, or similar activities.

As used herein for the sake of readability, the term "hook" is used to refer to the hardware or structure at the ends of a tow line or winch line. However, the "hook" is analogous to and interchangeable with various types of connector hardware, locking loops, shackles, carabiners, and any other type of hard or soft connectors known in the art. Thus, the use of the term "hook" is for convenience and should not be construed as limiting in any way.

The dampener of the invention is configured to reduce the energy of a ricocheting motion that is caused if the towline is inadvertently released while under tension. The dampener comprises a receptacle made of a flexible material of a suitable size and strength to hold at least ten kilograms. In one embodiment, the receptacle has a resealable opening along one side for filling the receptacle with matter. In another embodiment, the resealable opening is at or near an end of the receptacle. A line extends from each end of the receptacle, and may be a sturdy fabric, a rope, a cable, a chain, or any other suitable structure. At the distal ends of the line is a clasp that is configured to attach to either the soft towline itself, or to a hardware or other attachment at the end of the towline, which is used to connect the towline to a towing vehicle or a vehicle or other object to be towed. The vehicle can be one that is stuck in mud, water, snow, sand, or one that is disabled or inoperable for any reason. Other objects that may be pulled or towed include a trailer, cargo, a boat, a piece of sports equipment, any other objects or equipment that may or may not be mounted on wheels. The object to be towed or pull may also be a boat, water sports equipment or a person in a body of water.

In another embodiment, the invention is a method for using the towing safety device to dampen a ricocheting motion of the end of the towline if the towline is inadvertently released while under tension. The towing safety device comprises a receptacle made of a flexible material of a suitable size and strength is filled with at least ten kilograms of matter through a resealable opening. A clasp at a first end is connected to a hardware piece that attaches the soft towline to a towing vehicle. A second clasp at the other end of the towing safety device is connected to the towline itself. The opposite end of the towline is attached to a disabled or inoperable second vehicle or other object to be towed. When the soft towline is under tension, such as when the towing vehicle begins to pull or tow the second vehicle, it sometimes may be inadvertently released or detached from the first vehicle. If it is released or detached, the towing safety device will dampen the ricocheting motion of the hardware at the released end of the towline and the hardware will fall to the ground, thus preventing injury and damage to the occupants and vehicle being towed.

As used herein, the term "reversibly" means that a connector or connection can made and unmade, i.e., it is not permanently attached. The term "reversibly" is also used to describe the opening in the receptacle of the invention to indicate that it may be opened and closed an indefinite number of times and is neither permanently opened nor permanently closed.

In another embodiment of the invention, at least two towing safety devices are deployed, with one at each end of the towline. In this configuration, the occupants and vehicles at either end of the towline are protected from the slingshot ricocheting motion of the hook or any other hardware at the end of a towline.

In one embodiment of the invention towing vehicle is selected from the group consisting of a car, a truck, an SUV and a boat, and the object to be towed is selected from the group consisting of a car, a truck an SUV, a boat, a trailer, a motorcycle and an all-terrain vehicle. In another embodiment, the towing vehicle is a sail or a parasail and the object to be towed is a person using water sport equipment. In yet another embodiment, the towing vehicle is a boat, and the object to be towed is a person using water sports equipment. Water sports equipment can include but is not limited to water skis, waterboard, personal watercraft and personal floatation devices.

In one embodiment of the invention, the receptacle in the dampener is left empty for storage until a time of deployment of the safety device. When it is needed the resealable opening is opened and the receptacle can be filled with any suitable material that is available. This could include but is not limited to stones, rocks, pebbles, gravel, sand, bricks, soil and/or water, or any other materials that might be found in the local environment. The ability to store the dampener with an empty and folded receptacle is a key feature of the invention, since this allows it to occupy very little space in a cargo compartment or trunk, and then it can be filled with whatever weighted materials or matter is available in the field. Alternatively, a user might carry the filling matter in a storage compartment or trunk of a vehicle, such as a bag of sand, bricks or any other heavy materials of a suitable size. In another embodiment, the receptacle is filled with heavy weight materials and stored in a vehicle for future use. Since the weight of the matter filling the receptacle needs to weigh more than the hardware parts at the end of the soft towline, the total weight of the filler is preferred to be at least 10 kilograms. However, less weight may be used if two or more towing safety devices are connected at the same end of a towline. In another embodiment, the total weight of each towing safety device is greater than 10 kilograms, and multiple towing safety devices are deployed on an end of the soft towline to compensate for hardware that exceeds 10 kilograms. In yet another embodiment, multiple towing safety devices are used on both ends of the soft towline.

Before exemplary embodiments of the present invention are described in greater detail, it is to be understood that this invention is not limited to any particular embodiments described herein and may vary. It is also to be understood that the terminology used herein is for the purpose of describing particular embodiments only, and is not intended to be limiting, since the scope of the present invention will be limited only by the appended claims.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

EXAMPLES

The following Examples provide exemplary designs and methods for fabricating and using microgrippers of the invention. These Examples describe materials and methods for using embodiments illustrated in FIGS. 1-11. Additional details can be found in the section entitled "Brief Description of the Drawings".

Example 1

A Towline Safety Device

FIG. 1 shows diagram of a towline safety device (TSD) 100 of the invention. The TSD 100 comprises a receptacle 200 with at least a 10-liter volume capacity. The receptacle is made from a flexible material so it can be folded easily to take up as little space as possible. It can be watertight as well. It has an opening 300 along one long side or, alternatively, an opening (not shown) at an end of receptacle 200. The openings can be reversibly opened and closed with a commonly used mechanism, including but not limited to a zipper, Velcro, or a hook-and-loop reusable fastener or pressure closure. The TSD 100 has a line 400 extending out from each of the opposite ends of receptacle 200. The terminus of each line 400 is connected to a clasp 500 that can be attached to a towing cable (not shown) or to connection point on a towing line, such as a loop in the towing cable or a piece of towing hardware (not shown). The TSD 100 is flexible and can be folded up and placed inside a carrying case (not shown), which optionally can also contain a soft towline, for storage together. Thus, the TSD 100 can be stored in a convenient place such as a vehicle trunk or cargo container until it is needed.

Example 2

Towline Hardware, Clasp Hardware and Connection Configurations

Figure 2A:
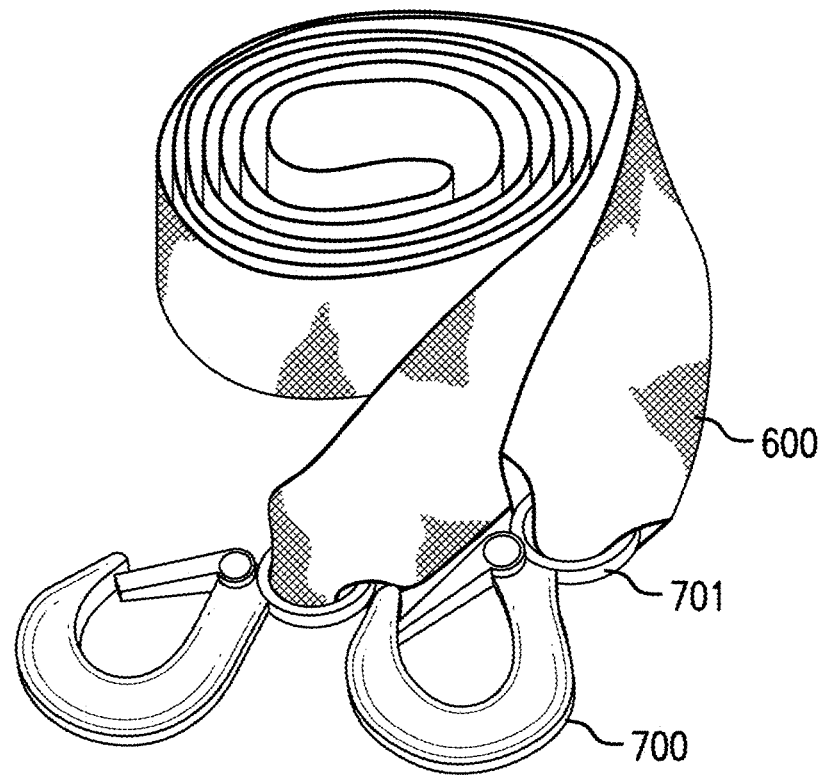
FIGS. 2A-2C show various types of towlines and towing hardware and illustrates in each a connection point 701 for connecting a TSD.
Figure 2B:
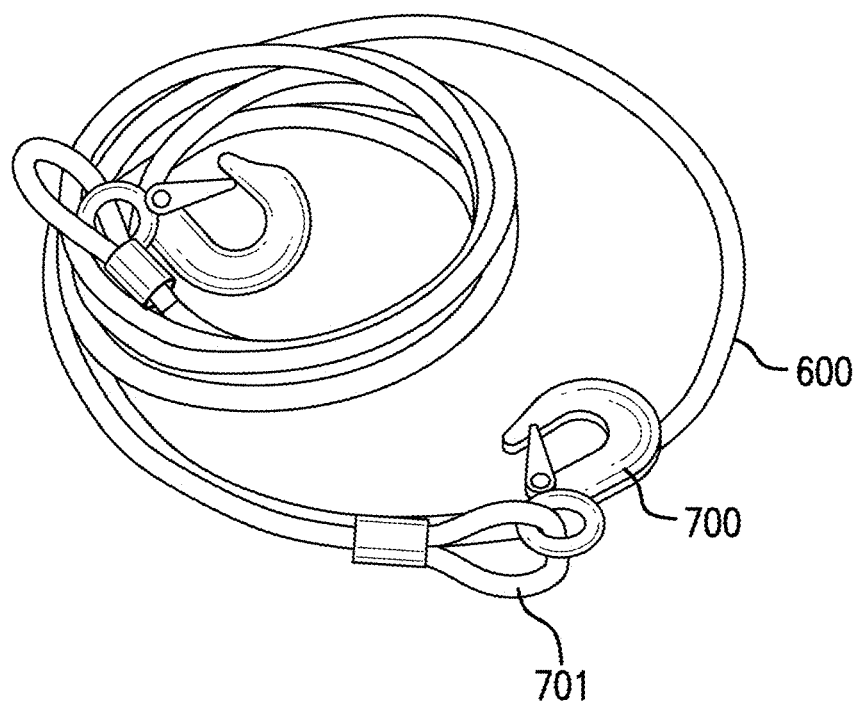
Figure 2C:
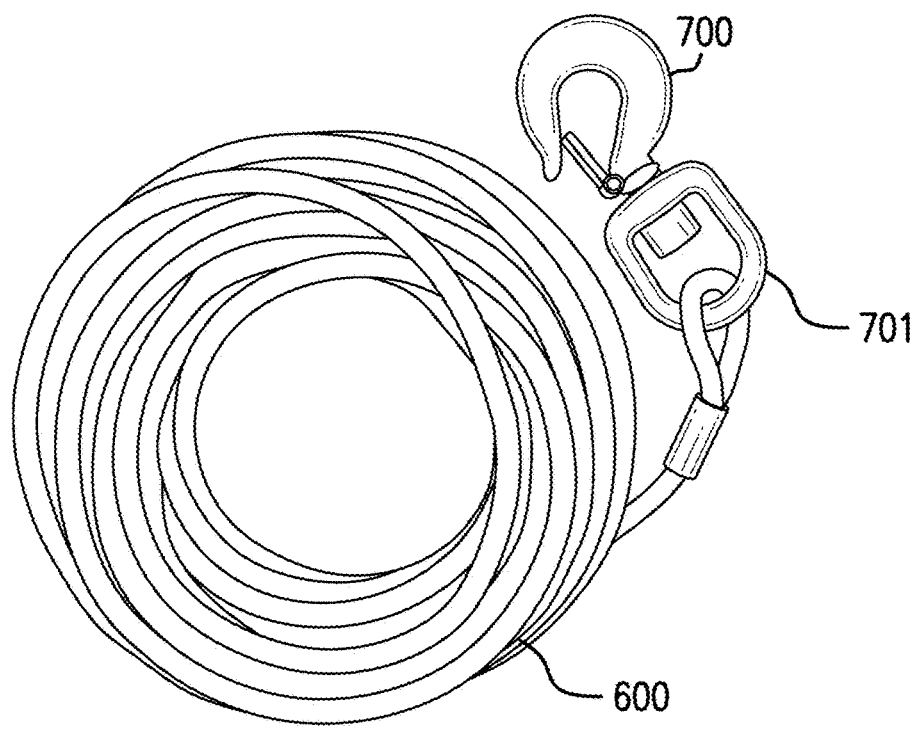

The towing hardware comprises a hook that attaches to a vehicle and further comprises a connection point to which the TSD will be connected. The hook and connection point hardware pieces are attached to the towline in a variety of ways. For example, FIG. 2A shows a fabric towline 600 with a hook 700 connected at the end of the towline 600 by rounded section at the base of the hook. In this example, the rounded section at the base of the hook is also connection point 701. An end of the fabric strap fits through the end of the rounded section and is folded back and adhered to the length of fabric strap. The fabric loop can be continuously woven, glued, or sewn, or combination of these, in order to securely hold the hook 700 at the end of the fabric strap comprising towline 600. FIG. 2B shows a towline 600 comprising a steel cable with a plastic jacket. Hook 700 is connected at its base to the looped end of the cable, thus serving as connection point 701. FIG. 2C is similar to the design shown in FIG. 2B, but has hook 700 secured with a loop at the end of the steel cable tow line 600 to a swiveling connection point 701.

Figure 3:
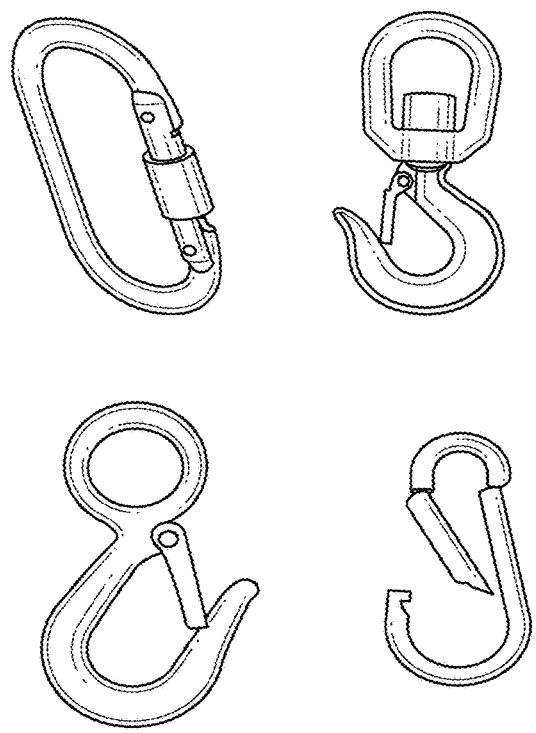
FIG. 3 shows various types of clasps that can be used on a TSD as connectors to a towline.

The TSD is attached or connected to the towline with a clasp that is connected to the terminal end of line 400 at each end of the TSD. The types of connectors useable on the first and second ends of the first and second lines of the dampener can vary depending on the needs of the design or user. FIG. 3 shows a variety of hardware elements that can be used as clasp 500 and/or clasp 500a in any embodiment of the invention. The examples shown in FIG. 3 are not limiting, since the line 400 can also be tied to a towline, or tied to form a loop through which a towline can pass, or tied to a towing hook hardware or a loop in the towline. Thus, any connection or attachment device that allows the TSD to be operably connected to a towline is suitable.

Figure 4C:
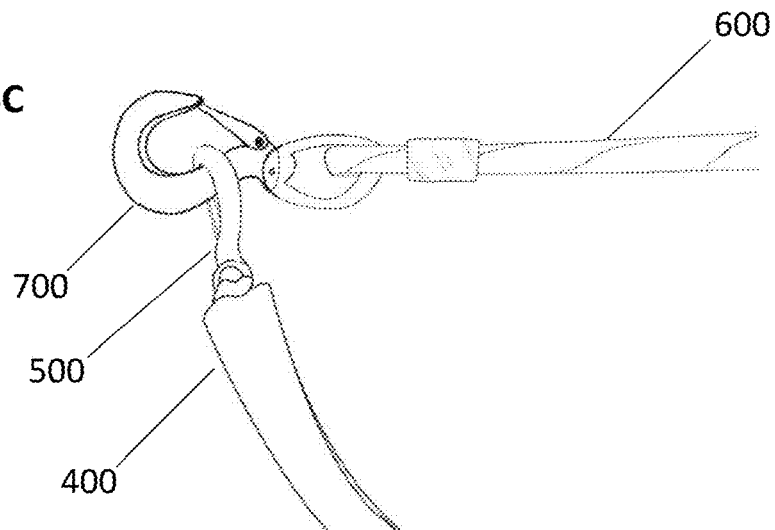
Figure 4D:
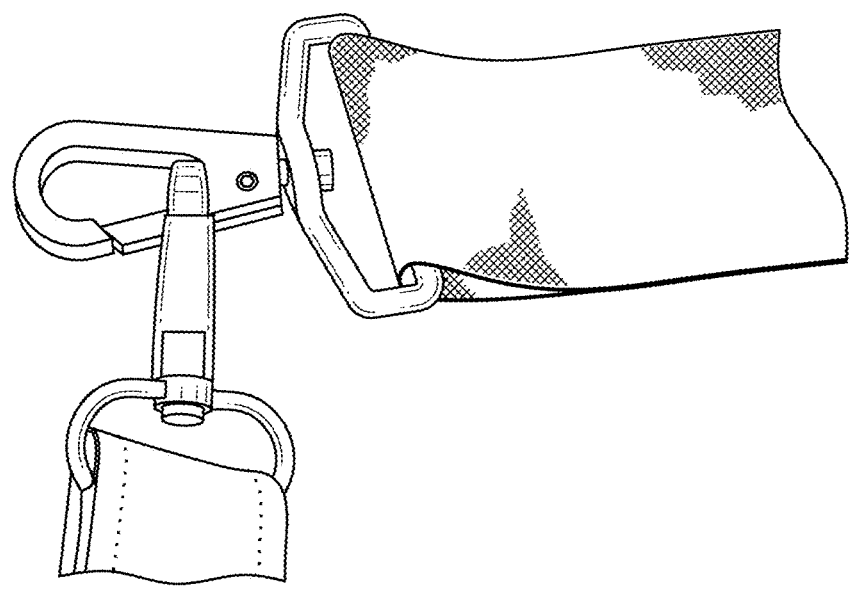
Figure 4E:
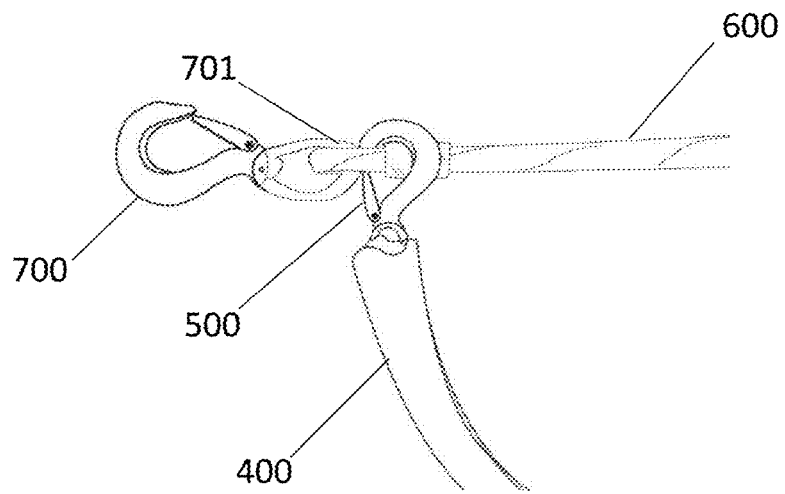
Figure 4F:
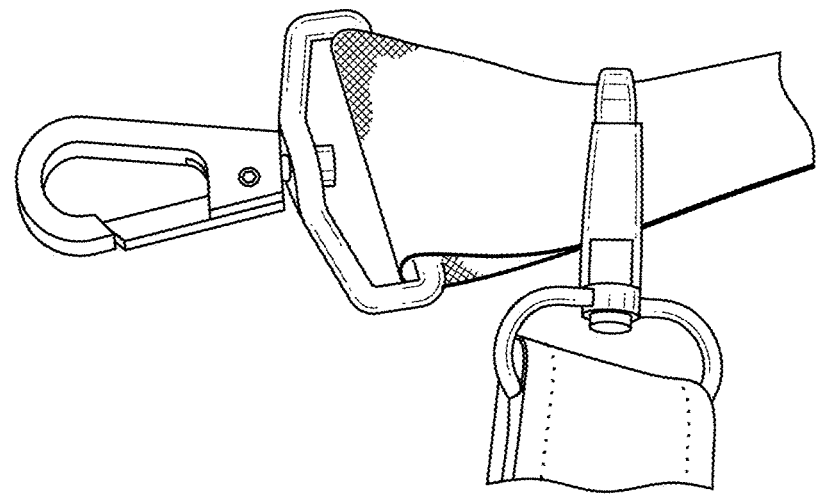

Another consideration is the configuration of connection between clasp 500 at a first end of a TSD and the towing hardware. FIGS. 4A-4F show various configuration that may be used to connect clasp 500 and hook 700, connection point 701 or towline 600 are shown. As shown in FIG. 4A, a clasp 500 of a TSD dampener can be connected to a connection point 701. FIG. 4B is a photograph of a prototype connected in the same configuration as that shown in FIG. 4A. In contrast, as shown in FIG. 4C, clasp 500 can be connected to hook 700. In this example, hook 700 performs the function of both towing hook and connection point, so that use of a separate connection point 701 is not required. FIG. 4D is a photograph of a prototype connected in the same configuration as that show in in FIG. 4C. The towing hardware can also be attached to a loop in towline 600 adjacent the connector, as in FIG. 4E, which shows clasp 500 connected to a loop formed at the end of the of towline 600. FIG. 4F is a photograph of a prototype wherein clasp 500 is connected directly to towline 600. It is further contemplated that a can be formed by knotting a towline at a desired location and clasp 500 can be connected to the loop formed in the towline (not shown).

FIGS. 5A-5D illustrate two configurations of a connection between the second end of a TSD and a towline. The second end of a TSD 100 comprises a second line 400 terminating in clasp 500a, and clasp 500a is connected to towline 600. As shown in FIG. 5A, line 400 can wrap around towline 600 and clasp 500a can be connected to line 400. FIG. 5B is a photograph of a prototype connected in the same configuration as that shown in FIG. 5A. As shown in FIG. 5C, connector 500a can connect directly to the tow line 600, which passes through clasp 500. FIG. 5D is a photograph of a prototype connected in the same configuration as that shown in FIG. 5C. A towline may comprise a hardware connection point or a loop at a desired connection location for clasp 500a, but this is not required.

Example 3

Dampening Effect of a Towline Safety Device Attached to a Soft Towline

Figure 6:
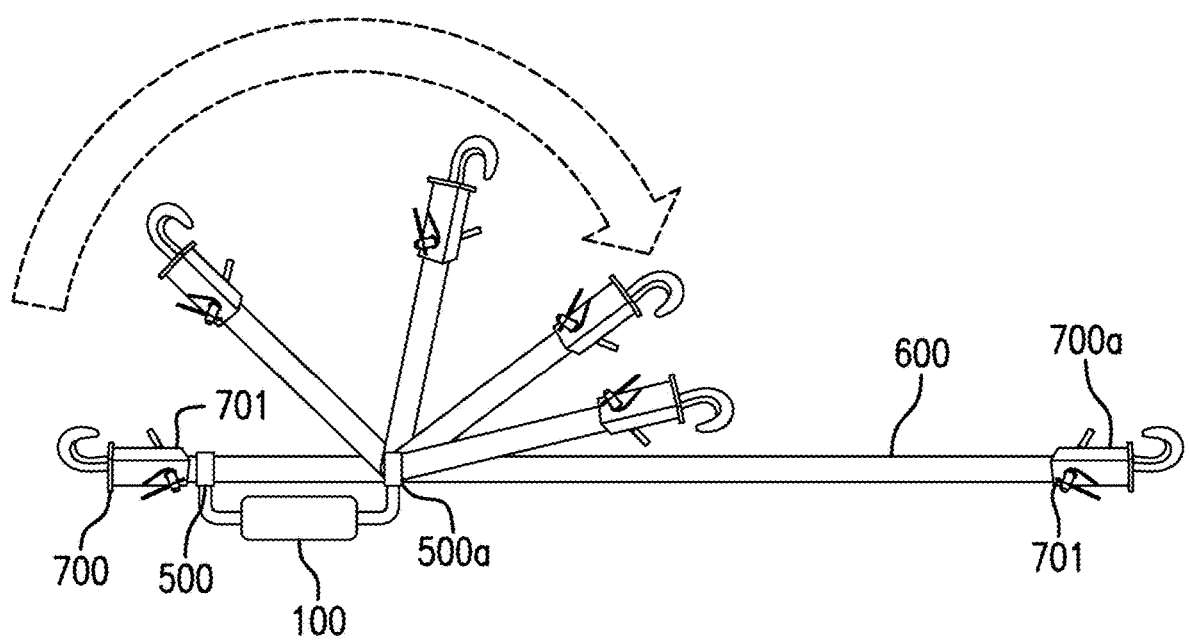
FIG. 6 shows an illustration of the dampening effect that the TSD has on the ricocheting effect of a soft towline that has been accidentally released while under tension. Not drawn to scale.

FIG. 6 shows a diagrammatic representation of the dampening effect that a TSD 100 provides to a towline 600 when a hook 700 connecting the towline 600 to a vehicle or object (not shown) has broken or failed. Clasp 500 is attached to connection point 701 at or near the base of hook 700. Clasp 500a may be attached to a suitable attachment point on towline 600, or towline 600 may pass freely through clasp 500a. Aside from the orientation and points of attachment, clasp 500 and clasp 500a are identical, thus the TSD may alternatively be deployed in the reverse orientation. Hook 700a at the opposite end of towline 600 may be identical to hook 700. In this example, hook 700a is attached to a disabled vehicle or other object to be towed (not shown). When towline 600 is under tension, such as during towing, towline 600 is taunt. If hook 700 attached to the towing vehicle is inadvertently released, TSD 100 will act as a counter-balancing weight that dampens the ricocheting action of the released hook 700 and prevents it from flying back and hitting the disabled vehicle or other object. The broken-line arrow approximates the arc of dampening that will occur due to the weight of TSD 100, which creates a fulcrum at the point of contact between towline 600 and clasp 700a. The dampening effect also will prevent the towline 600 from flailing randomly, thus also reducing the likelihood of injury to bystanders or damage to surrounding property.

Figure 7A:
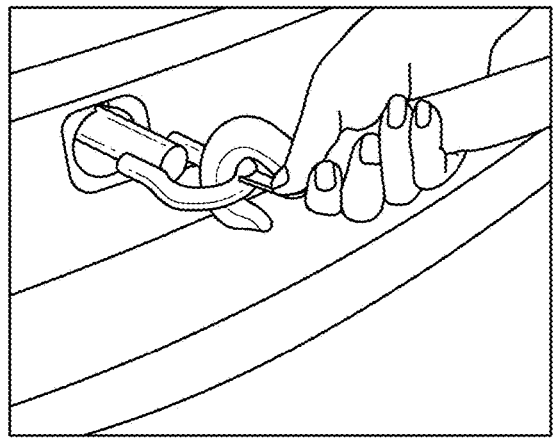
FIGS. 7A-7D show damage that can occur when a soft towline is accidentally released from an attachment point at a towing or towed vehicle without using the TSD of the invention. 7A shows a towline that is being connected to a vehicle with a hook. Even though the hook has a safety latch, the latch or hook can fail or break and inadvertently be released from its connection point. If this occurs when the towline is under tension, the hook can ricochet and damage a vehicle window, as in 7B and 7D, or a vehicle body part, as in 7C.
Figure 7B:
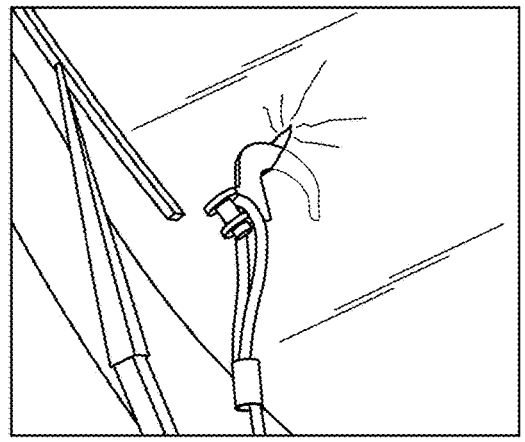
Figure 7C:
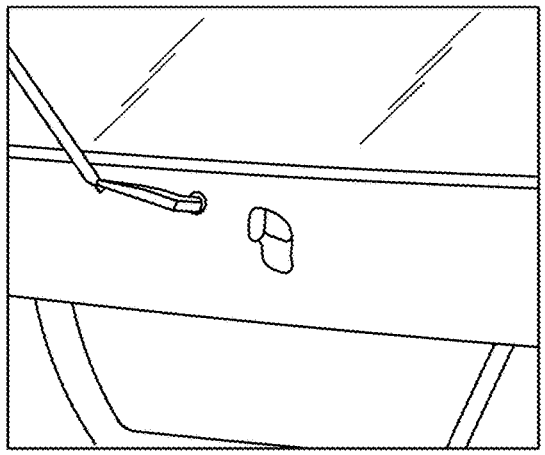
Figure 7D:
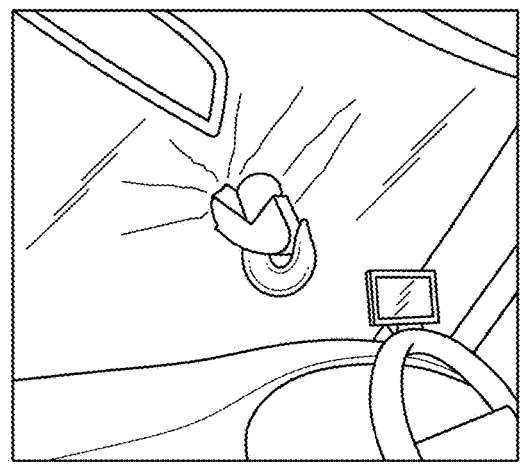

FIGS. 7A-7D shows the results that can occur when a conventional soft towline is used without the benefit of the safety device of the invention. FIG. 7A shows a towline that is being connected to a vehicle with a hook. Even though the hook has a safety latch, the latch or the hook can fail or break, or the hook or line may inadvertently be released. If this occurs when the towline is under tension, the hook can ricochet and damage a vehicle window, as shown in FIGS. 7B and 7D, or a vehicle body part, as shown in FIG. 7C.

Example 4

Preparation and Deployment of the TSD for Safe Towing

Figure 8:
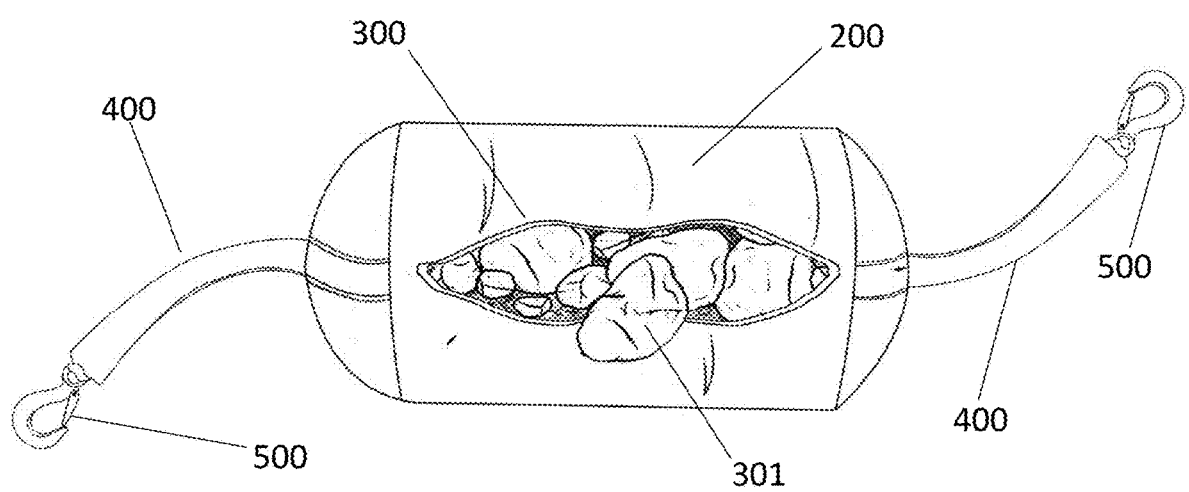
FIG. 8 shows a TSD prepared for use by loading receptacle 200 through opening 300 with heavy materials 301, which are illustrated by rocks in this drawing. Opening 300 is then reclosed or resealed.

The TSD can be stored empty and flat until needed, at which time it may be prepared for use. When it is needed, a TSD 100 is unfolded and opening 300 is opened and receptacle 200 is filled with heavy materials 301, as is illustrated in FIG. 8. Heavy materials 301 may be stones, sand, mud, water, rocks, gravel, bricks or any other heavy material(s) from the surroundings. When receptacle 200 is filled, the TSD should weigh at least 10 kg. In any case, the fully loaded TSD with material must weigh more than the towing hardware to which it will be connected. After filling, the opening is closed and/or resealed.

Figure 9:
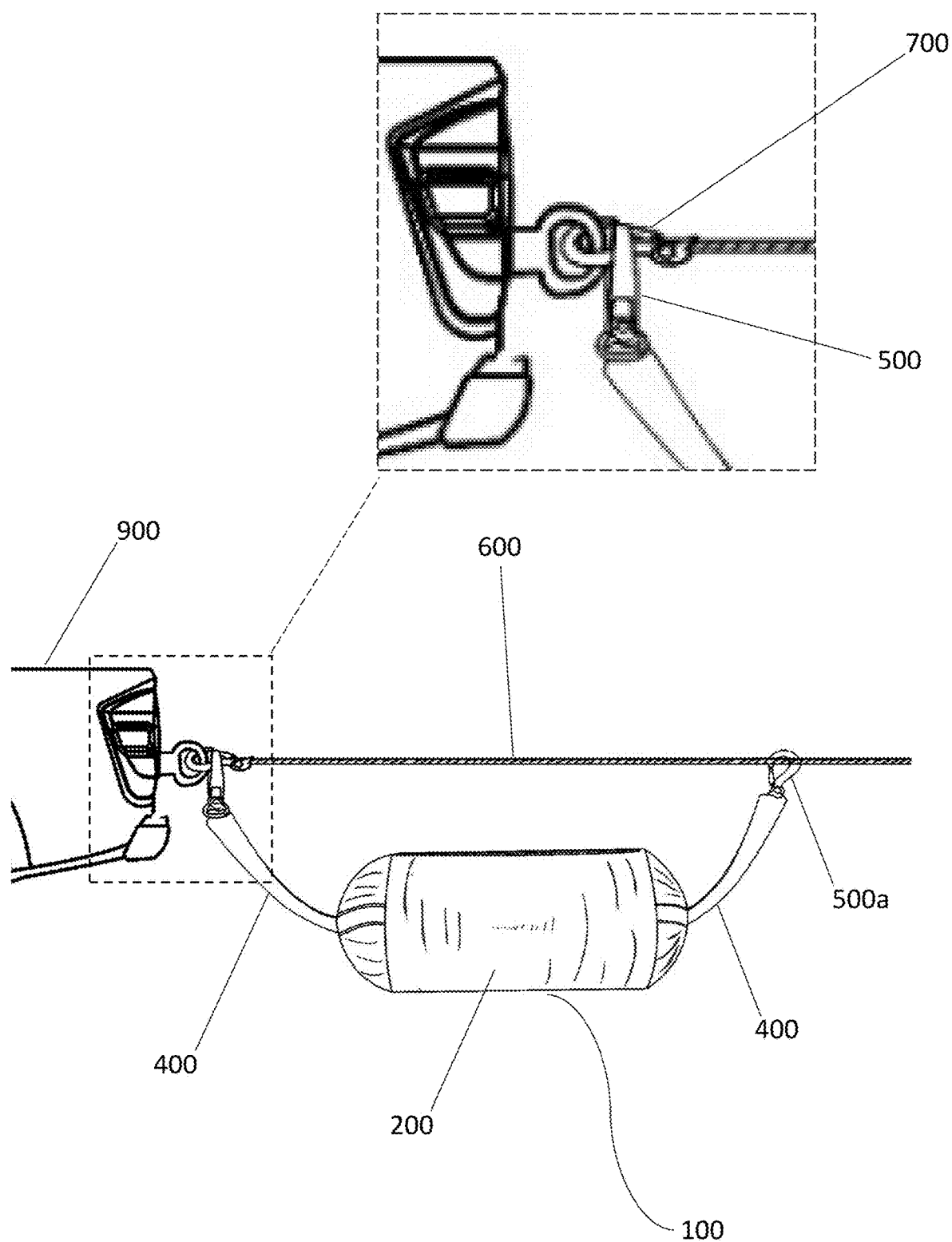
FIG. 9 shows deployment of a TSD 100 on a towline 600, which is attached to a towing vehicle 900, with an expanded detail showing the connection of clasp 500 to hook 700. Not drawn to scale.
Figure 10:
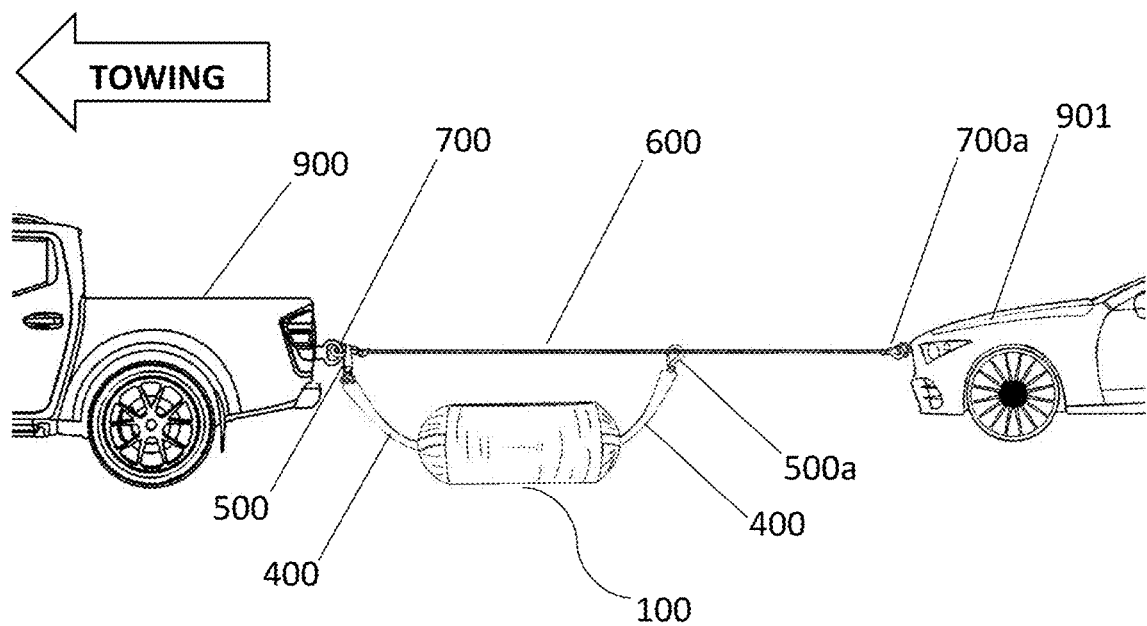
FIG. 10 shows the positioning of a single TSD during a towing operation. Not drawn to scale.

When the TSD is deployed on a towline, one end will be connected to towing hardware and the other end connected to the tow or winch line itself. FIG. 9 shows a method deploying a TSD by attaching it to a towline 600 connected to a towing vehicle 900. Receptacle 200 containing weighted material has a line 400 extending from each end, and a clasp 500 or 500a at the terminus of each line 400 for connecting the TSD to towline 600. Clasp 500 is connected to the end of towline 600 at hook 700, which in turn is attached to towing vehicle 900, as shown in expanded detail of FIG. 9. At the opposite end of the TSD, towline 600 passes through a clasp 500a. When the TSD is fully deployed on towline 600 and hook 700a at the opposite end of towline 600 is attached to a vehicle 901 or other item to be towed, the towline is ready for towing, as shown in FIG. 10. The arrow indicates the forward direction of towing, and towline is shown under tension. In the present configuration, if any part of the attachment hardware at vehicle 900 fails, the weight of materials inside receptacle 200 will dampen the recoil and ricochet effect generated by the sudden release of towline 600, thus sparing inoperable vehicle 901 from impact with hardware still connected to the loose end of towline 600.

After the towing operation is completed, each TSD 100 can be is emptied of whatever materials it was filled with (sand, mud, water, rocks, etc.) through the opening in the receptacle. The device can then be folded up and returned to its carrying case for storage.

Example 5

Method of Using Two TSDs with a Towline Cable

Figure 11:
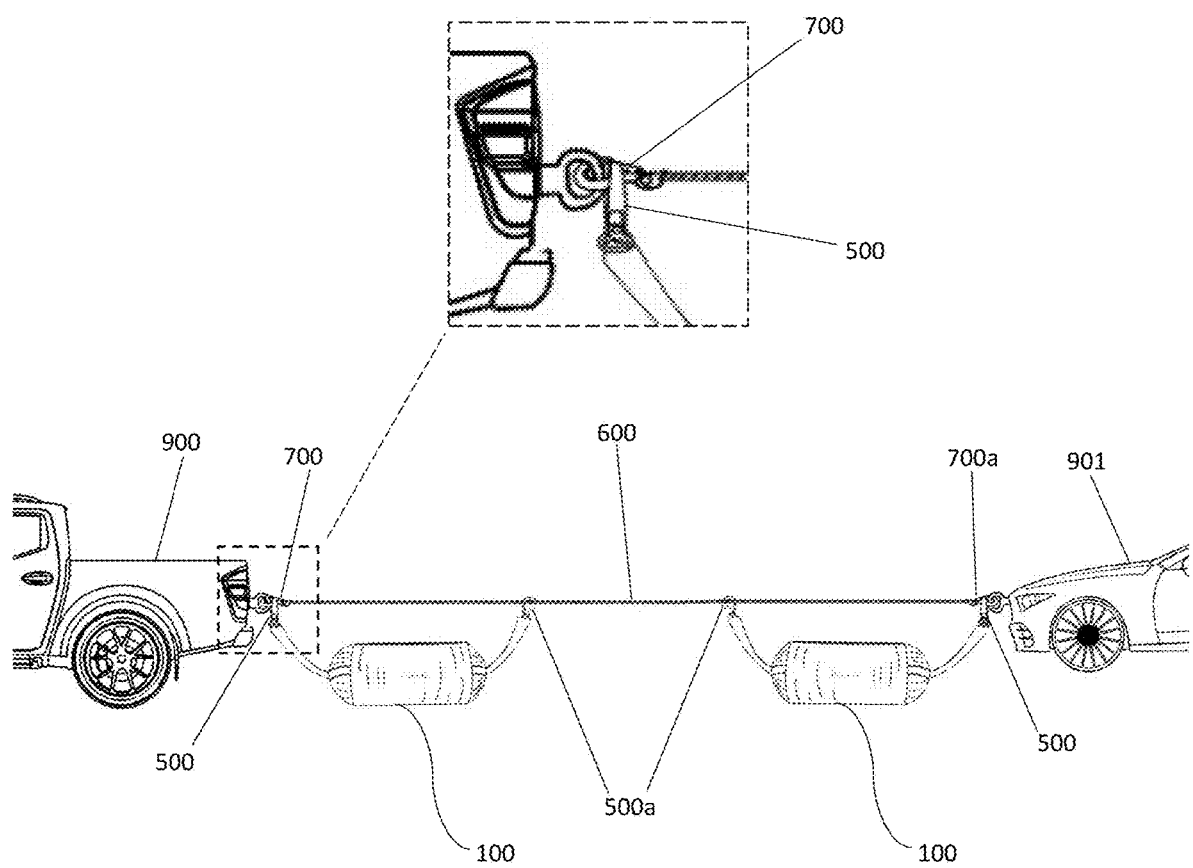
FIG. 11 shows the positioning of two TSDs during a towing operation, with expanded detail showing connection of clasp 500 to hook 700. The connection of clasp 500*a* to hook 700*a* is the same as that of clasp 500 and hook 700, however any other configuration may be used, such as those illustrated in FIGS. 4A-4F. Not drawn to scale.

For additional safety and caution, a second TSD can be deployed so that one is at each end of the towline. FIG. 11 shows a diagram wherein two TSDs are in use during towing, with a TSD 100 positioned at each end of towline 600. A first TSD 100 is connected using a clasp 500 to a first end of towline 600 at towing hook 700, as shown in expanded detail in FIG. 11. Towline 600 passes through clasp 500a, which can move freely on towline 600. A second TSD 100 is connected to the second end of towline 600 in the same manner. Towing hook 700a is connected to disabled vehicle 901 and towing hook 700a is connected to towing vehicle 900. Arrows show the direction of movement. If for any reason either or both of hook 700 or hook 700a fail under tension, the path of ricocheting hook 700 or hook 700a will be inhibited by at least one TSD 100 since the material inside receptacle 200 is heavier than the hooks. Instead, the flight of the ricocheting hook 700 and/or 700a will be dampened and fall to the ground, rather than slingshotting and causing injury or property damage.

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

I claim:

1. A method of protecting against spring-back of towing hardware when using a tow line, comprising:
    connecting the tow line to a vehicle to be towed;
    connecting at least one dampener to the tow line, wherein the at least one dampener comprises
        a receptacle;
        an opening in the receptacle which is selectively openable and closeable, wherein the opening allows weighted material to be selectively added to an inside of the receptacle during use and removal of the weighted material when not in use;
        a first connector configured for reversible connection with the tow line;
        a second connector configured for reversible connection with the towing hardware;
        a first line extending from a first end of the receptacle to the first connector; and
        a second line extending from a second end of the receptacle to the second connector,
    wherein said step of connecting the at least one dampener to the tow line is performed with the first connector;
    filling the receptacle with weighted material sufficient to dampen springback of the towline,
    connecting the at least one dampener to the towing hardware on the vehicle to be towed or towing hardware on a towing vehicle at an end of the tow line, wherein said step of connecting the at least one dampener to either the towing hardware on the vehicle to be towed or the towing hardware on the towing vehicle is performed with the second connector; and
    towing the vehicle to be towed with the towing vehicle.

2. The method of claim 1 further comprising closing and sealing the opening in the dampener which provides access to the inside of the dampener for filling the inside with weighted material.

3. The method of claim 1 wherein the at least one dampener includes at least two dampeners, and wherein said step of connecting the at least one dampener to the towing hardware on either the vehicle to be towed or the towing vehicle at an end of the tow line via the second connector includes connecting a first one of the at least two dampeners to the towing hardware on the vehicle to be towed at one end of the tow line via the second connector of the first one of the at least two dampeners and connecting a second one of the at least two dampeners to the towing hardware on the towing vehicle at the other end of the tow line via the second connector of the second one of the at least two dampeners.

4. The method of claim 1 wherein said step of connecting the at least one dampener to the towing hardware on either the vehicle to be towed or the towing vehicle at the end of the tow line is performed by connecting a clasp of the second connector to a clasp at the end of the towline.

* * * * *